United States Patent [19]

Peters et al.

[11] Patent Number: 4,517,841
[45] Date of Patent: May 21, 1985

[54] ACCELEROMETER WITH BEAM RESONATOR FORCE TRANSDUCER

[75] Inventors: Rex B. Peters, Woodinville; Jeffrey F. Tonn, Tacoma; Arnold Malametz, Carnation; Richard A. Hilliker, Seattle; Victor B. Corey, Bellevue, all of Wash.

[73] Assignee: Sundstrand Data Control, Inc., Redmond, Wash.

[21] Appl. No.: 456,254

[22] Filed: Jan. 6, 1983

[51] Int. Cl.³ .............................................. G01P 15/10
[52] U.S. Cl. .............................. 73/517 AV; 73/DIG. 1
[58] Field of Search ............. 73/517 AV, DIG. 1, 497

[56] References Cited

U.S. PATENT DOCUMENTS 3,329,026  7/1967  Savet .............................. 73/517 AV
3,541,849  11/1970  Corbett ...................... 73/517 AV X
4,221,131  9/1980  Albert .............................. 73/517 AV

FOREIGN PATENT DOCUMENTS 671392  5/1952  United Kingdom ........... 73/DIG. 1

OTHER PUBLICATIONS

Report AFWAL-TR-81-1229 entitled New Sensor Concepts Low Cost Vibrating Beam Accelerometer, by W. C. Albert, Dec. 1981.

Primary Examiner—James J. Gill
Attorney, Agent, or Firm—Wood, Dalton, Phillips, Mason & Rowe

[57] ABSTRACT

An accelerometer includes a hinged proof mass constrained from movement by a beam resonator force transducer. To afford greater movement of the proof mass and greater latitude in positioning mechanical stops, one end of the force transducer is connected with the accelerometer base through a compliant mount. The other end of the force transducer is connected with the proof mass at the center of percussion of the proof mass. Adjacent surfaces of the proof mass and base provide squeeze film viscous gas damping. A pair of proof mass-force transducer systems are mounted on a carrier in opposite positions with the sensitive axes of the proof masses aligned and the proof mass hinge axes parallel and opposed to each other.

17 Claims, 5 Drawing Figures

ACCELEROMETER WITH BEAM RESONATOR FORCE TRANSDUCER

DESCRIPTION

1. Technical Field

The invention relates to an accelerometer having a hinged proof mass constrained by a beam resonator force transducer.

2. Related Application

Malametz et al application Ser. No. 456,255, filed Jan. 6, 1983, now U.S. Pat. No. 4,467,651, filed concurrently herewith and assigned to the assignee of this application, discloses and claims an improved method for determining acceleration from the transducer signals.

BACKGROUND OF THE INVENTION

An accelerometer using a beam resonator force transducer to constrain the proof mass movement has advantages as compared with a servoed accelerometer of simplicity, low cost and an inherently digital output. The beam transducer is typically made of quartz which is quite brittle. Accordingly, protection must be provided from over range inputs. The use of mechanical stops is known. However, the proof mass motion must be less than 0.00010 inch. It is difficult to manufacture an accelerometer with stops which will maintain such small dimensions over a range of temperatures.

SUMMARY OF THE INVENTION

One feature of the invention is the provision of an accelerometer with a compliant mount for the beam transducer which allows the proof mass to have greater movement without damage to the transducer. The precision required in setting the mechanical stops is thus reduced.

Another feature is that the proof mass is hinged to a base and the beam transducer is connected to the proof mass at an intermediate point while the mechanical stops are positioned to be contacted with the extremity of the proof mass. The proof mass motion at the extremity is greater than that imparted to the beam transducer. Again, the precision required in setting the mechanical stops is reduced.

A further feature is the provision of squeeze film viscous gas damping of the proof mass in combination with the compliant mount. This combination increases the ratio of damping force to restoring force, minimizing the response of the proof mass to mechanical resonances without adversely affecting the sensitivity of the accelerometer.

Yet another feature of the invention is that the beam transducer is connected with the proof mass at the center of percussion of the proof mass. This geometric relationship minimizes vibration sensitivity of the accelerometer.

Further features and advantages of the invention will readily be apparent from the following description and from the drawings.

The base, proof mass and compliant mount of the accelerometer described herein could be manufactured from an integral block of natural or synthetic quartz as by electrochemical etching. The beam resonant force transducer is preferably of the double ended tuning fork construction illustrated in detail in EerNisse U.S. Pat. No. 4,215,570 issued Aug. 5, 1980. The force transducer has a resonant frequency which is a function of the axial force to which it is subjected.

Figure 1:
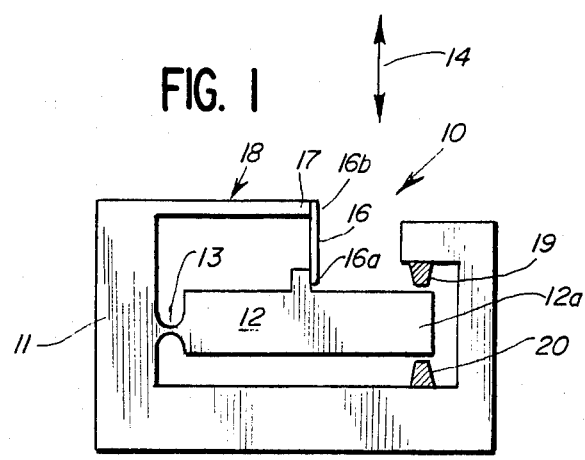
FIG. 1 is a diagrammatic illustration of one form of the invention.

Turning now to FIG. 1 of the drawings, an accelerometer 10 is illustrated having a base 11 with a proof mass 12 connected thereto by a hinge or flexure section 13. The proof mass responds to components of acceleration along the sensitive axis indicated by double-ended arrow 14. Beam resonator force transducer 16 has an end 16a connected with proof mass 12 and the other end 16b connected with the free end 17 of a cantilevered beam 18 extending from base 11, providing a compliant mount for the force sensor. When an acceleration displaces proof mass 12 from its steady state position, beam 18 deflects. A greater motion of the proof mass may occur without exceeding the force limits of the transducer than is possible if the beam transducer end 16b is fixed to a rigid mount. Accordingly, stops 19, 20 may be spaced apart a greater distance and the precision required in manufacturing is reduced.

Beam transducer 16 is connected with the proof mass at a midpoint of the proof mass 12. The stops 19, 20 are located on base 11 to be contacted by the extremity 12a of the proof mass, remote from flexure 13. This relationship further increases the allowable spacing between the stops and reduces the precise dimensional requirements for manufacturing.

The cantilever beam 18 illustrated in FIG. 1 is the preferred form of compliant mount for the accelerometer disclosed in this application. Other structural configurations may be used. For example, the compliant mount might be a beam clamped or supported at both ends with the force transducer connected thereto near the center; or a member stressed in compression, tension or torsion to afford compliance.

The proof mass 12 and force transducer 16 form a spring-mass system which has a natural resonant frequency. In addition, the system is strongly underdamped. If the accelerometer is excited by an input near the natural resonant frequency, there will be a sharp peak in accelerometer output. This nonuniform response is undesirable. Moreover, at or near resonance, the proof mass may strike a stop surface so that no useful output is attained.

Figure 2:
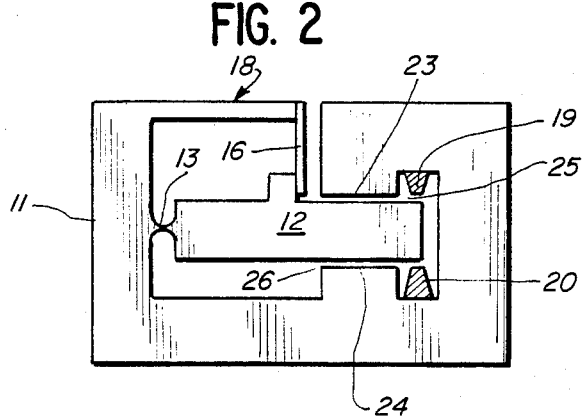
FIG. 2 is a diagrammatic illustration of another form of the invention.

FIG. 2 illustrates a structure providing damping through a squeezing action on a film viscous gas. Elements common to FIG. 1 are identified by the same reference numeral and will not be described in detail.

A pair of damping surfaces 23, 24 are provided on the base 11. The damping surfaces are parallel with and closely adjacent the upper and lower surfaces of the proof mass 12. Movement of the proof mass causes a squeezing of the gas within the narrow gap 25, 26. The amount of damping will vary with the area and spacing of the damping surfaces and with the pressure and viscosity of the gas.

Figure 3:
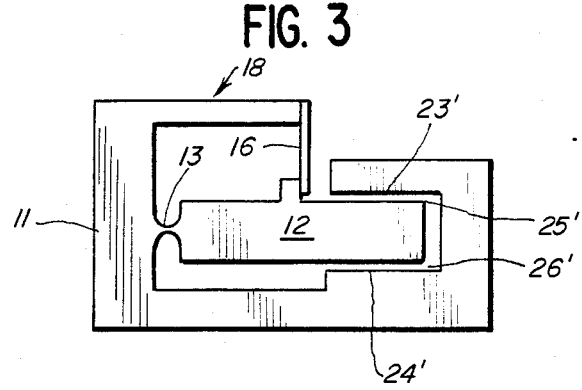
FIG. 3 is a diagrammatic illustration of still another form of the invention.

FIG. 3 shows a further modification of the accelerometer. Again, elements which are common with FIGS. 1 and 2 are identified by the same reference numerals, and a detailed description will not be repeated. In FIG. 3 the damping surfaces 23', 24' are selected both to provide damping as in FIG. 2 and to serve as stops in the event of acceleration inputs which are over-range.

The combination of the damping action of the accelerometers of FIGS. 2 and 3 with the compliant mount for force transducer 16 provides an accelerometer in which the ratio of damping force to restoring force is greater than if the force transducer is fixed to a rigid mount. The compliant resonator mount reduced the effective spring constant of the proof mass-force transducer system.

Figure 4:
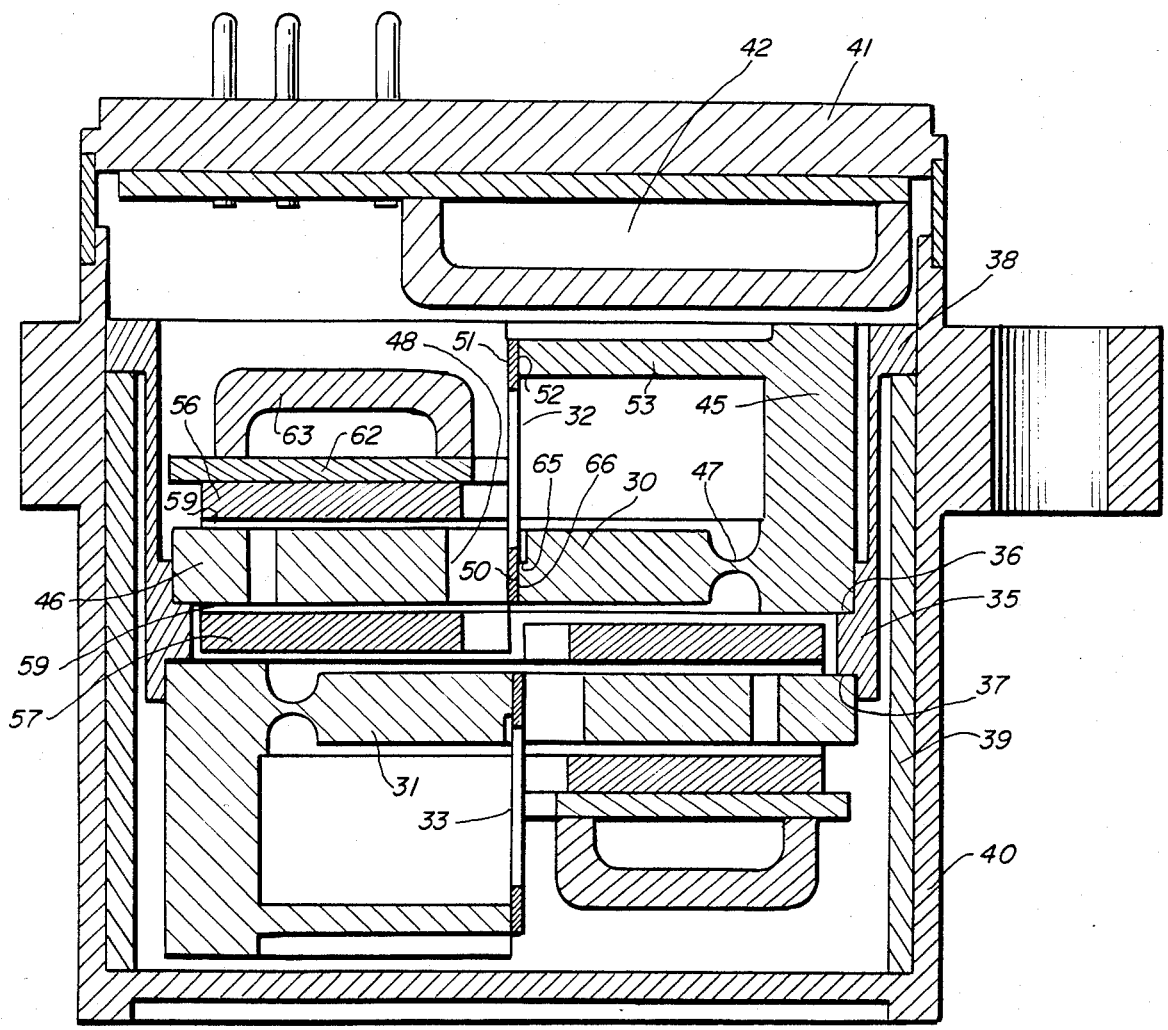
FIG. 4 is a longitudinal sectional view through an accelerometer embodying the invention.
Figure 5:
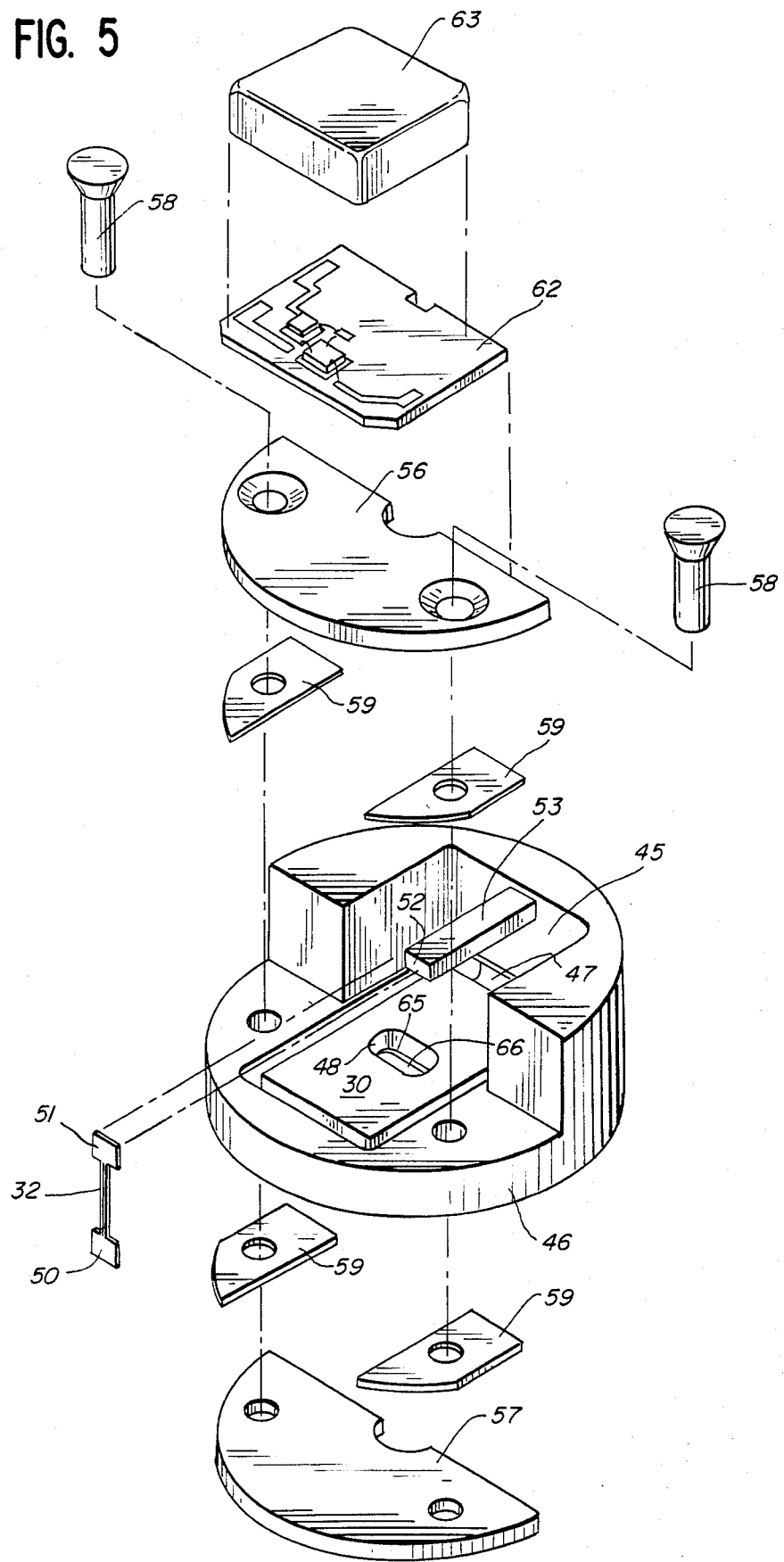
FIG. 5 is an exploded perspective of one proof mass and force transducer system of the accelerometer of FIG. 4.

FIGS. 4 and 5 illustrate a preferred embodiment of the accelerometer having two proof masses 30, 31, sensitive to accelerations along the same axis, mounted with the respective flexures opposite each other and with the beam resonant force transducers 32, 33 connected so that when one transducer is in tension the other is in compression. The acceleration is measured as a function of the difference between the resonant frequencies of the two beam force transducers. Further details regarding derivation of the acceleration from the transducer frequencies may be found in the aforementioned copending application. The two proof mass—transducer assemblies are identical and only one is shown in FIG. 5 and will be described in detail herein.

Cylindrical carrier 35 has oppositely directed seating surfaces 36, 37. The base for each proof mass includes a mounting element which is received in one of the seating surfaces. Carrier 35 has an outwardly extending rib 38 seated on a cylindrical spacer 39, supporting the two proof mass assemblies within housing 40. Cover 41 has an electronics compartment 42.

The upper accelerometer of FIG. 4, illustrated in exploded form in FIG. 5, has a base 45 which includes a mounting ring 46. Proof mass 30 is connected with the base by flexure section 47. Mounting ring 46 is received on the seating surface 36 of carrier 35.

Proof mass 30 is generally rectangular in outline and has the same thickness as mounting ring 46. An oval opening 48 is centrally located in the proof mass.

Beam resonant force transducer 32 has one end 50 secured to the wall of the opening 48 and the other end 51 connected with the end surface 52 of a cantilever beam 53 extending from base 45 and providing a compliant mount.

Plates 56 and 57 are secured to the upper and lower surfaces of mounting ring 46, respectively, and are held in place by fasteners 58. Shims 59 are interposed between the plates 56, 57 and the surfaces of mounting ring 46 spacing the surfaces of the plates 56, 57 from the upper and lower surfaces of proof mass 30. The spacing is exaggerated in FIG. 4. Plates 56, 57 serve as combined damping surfaces and stops for proof mass 30, as illustrated diagrammatically in FIG. 3.

A circuit board 62 is mounted on the upper surface of plate 56 and carries the electronics associated with resonant beam force transducer 32. A cover 63 encloses the components on the circuit board.

As best seen in FIG. 4, the wall of opening 48 in proof mass 30 has a step 65 in the surface closest to the flexure 47. The end 50 of transducer 32 is connected with the surface 66 remote from cantilever beam 53. The surface 66 is selected to include the center of percussion of proof mass 30. The center of percussion is that point in the proof mass at which the proof mass may be squarely struck without jarring the pivot axis provided by flexure 47. This geometric relationship minimizes the sensitivity of the proof mass to vibrations of the accelerometer.

There are a number of advantages achieved with the two proof mass construction illustrated in FIG. 4. Error sources which produce common mode effects on both proof mass-force transducer systems will be reduced. For example, if both transducers have similar temperature coefficients, the temperature sensitivity of the combination is considerably reduced.

Another example is the drift in the time base against which the transducer output frequencies are measured. Bias of the accelerometer is very sensitive to time base changes in a single proof mass sensor. If proof mass—transducer assemblies are approximately matched, time base drift is primarily a common mode signal, and bias sensitivity is greatly reduced.

The location of the two proof masses 30, 31 with their flexures opposite each other causes a cancellation of the sensitivity of the two proof masses to cross-axis accelerations.

Vibration rectification errors occur when the accelerometer is subjected to an oscillating input having a period shorter than the period for measuring the transducer frequencies. Nonlinear response of the transducers causes rectification of such oscillating inputs with a resultant shift in the accelerometer output. With the dual proof mass assembly having transducers mounted so that one is in tension and the other in compression, vibration rectification errors tend to cancel.

We claim:

1. In an accelerometer having a base, a proof mass hinged to the base to respond to an acceleration and a brittle, bidirectional, beam resonator force transducer having one end connected to the proof mass and the other end connected to the base, the output of the force transducer being a measure of the acceleration sensed by the proof mass, the improvement comprising:
a compliant mount having a bidirectional, linear and continuous force/deflection characteristic, interposed between the other end of the force transducer and the base to extend the range of movement of the proof mass without subjecting the force transducer to an excessive force.

2. The accelerometer of claim 1 in which said compliant mount is a cantilever beam extending from said base and having a free end with the other end of the force transducer connected to the free end of the beam.

3. The accelerometer of claim 1 in which the proof mass base and compliant mount are an integral structure of quartz.

4. The accelerometer of claim 3 in which said compliant mount is a cantilever beam extending from said base and having a free end with the other end of the force transducer connected to the free end of the base.

5. The accelerometer of claim 1 including, a stop on said base positioned for engagement by the extremity of said proof mass remote from said hinge to limit acceleration induced movement of the proof mass in one direction, said force transducer being connected with the proof mass at a point intermediate the hinge and the extremity of the proof mass.

6. In an accelerometer having a base, a proof mass, a hinge securing the proof mass to the base to respond to an acceleration and a beam resonator force transducer having one end connected to the proof mass and the other end connected to the base, the output of the force transducer being a measure of the acceleration sensed by the proof mass, the improvement in which said one end of the force transducer is connected to the proof mass at the center of percussion of the proof mass with respect to said hinge.

7. The accelerometer of claim 6 in which the proof mass has a central opening therethrough and said one end of the force transducer is connected with a wall of said opening.

8. The accelerometer of claim 7 in which the mating surfaces between the proof mass and said one end of the force transducer have a dimension less than the thickness of the proof mass.

9. The accelerometer of claim 8 in which the interconnection between the proof mass and said one end of the force transducer is remote from the connection of the force transducer to said base.

10. The accelerometer of claim 6 in which said hinge is a flexure connecting the proof mass to the base and the plane of the force transducer is parallel with the bending axis of the flexure.

11. A dual proof mass accelerometer comprising:
a carrier having two aligned, parallel, oppositely directed seating surfaces;
a pair of accelerometers, each having a base including a mounting element, a proof mass, a hinge connecting the proof mass to the base for pivotal movement to respond accelerations and a beam resonator force transducer with one end connected to the proof mass and the other end connected to the base,
the mounting element of each of the accelerometers being received on one of the seating surfaces of the carrier with the sensitive axes of the accelerometers aligned and with the hinge axes of the proof masses parallel and opposite each other.

12. The accelerometer of claim 11 having proof mass damping and stop plates secured to the mounting element of each accelerometer, the mounting elements and proof masses being the same thickness, with shims between the mounting elements and the stop plates.

13. The accelerometer of claim 11 in which said carrier seating surfaces and the mounting elements are circular.

14. The accelerometer of claim 13 in which said proof masses are rectangular.

15. The accelerometer of claim 11 in which the one end of each beam transducer is connected with the center of percussion of the associated proof mass with respect to the hinge therefor.

16. The accelerometer of claim 11 in which the other end of each beam transducer is connected with the associated base through a compliant mount having a bidirectional linear and continuous force/deflection characteristic.

17. The accelerometer of claim 16 in which the compliant mount is a cantilever beam extending from the base and having a free end with the other end of the beam transducer connected with the free end of the cantilever beam.

* * * * *